(12) United States Patent
Knoblauch (10) Patent No.: US 7,004,513 B2
(45) Date of Patent: Feb. 28, 2006

(54) PIPE COUPLING METHODS

(76) Inventor: Daniel J. Knoblauch, 4683 S. 112th St., Greenfield, WI (US) 53228

( * ) Notice: Subject to any disclaimer, the term of this patent is extended or adjusted under 35 U.S.C. 154(b) by 353 days.

(21) Appl. No.: 10/633,957

(22) Filed: Aug. 4, 2003

(65) Prior Publication Data

US 2005/0028345 A1    Feb. 10, 2005

(51) Int. Cl.
*F16L 21/02* (2006.01)
(52) U.S. Cl. ............... 285/370; 285/397; 285/235; 285/236; 285/420
(58) Field of Classification Search ............... 285/235, 285/236, 370, 372, 397, 409, 420
See application file for complete search history.

(56) References Cited

U.S. PATENT DOCUMENTS

| | | | | |
|---|---|---|---|---|
| 623,416 | A * | 4/1899 | McCrory | 285/66 |
| 961,638 | A * | 6/1910 | Painton | 285/66 |
| 1,110,011 | A * | 9/1914 | Schneider | 285/114 |
| 1,959,630 | A * | 5/1934 | Keitel | 285/106 |
| 2,490,907 | A * | 12/1949 | Kellaher et al. | 285/5 |
| 2,527,644 | A * | 10/1950 | Moulton | 285/6 |
| 2,619,384 | A * | 11/1952 | Jepson | 239/253 |
| 2,620,206 | A * | 12/1952 | Cornelius | 285/5 |
| 2,652,282 | A * | 9/1953 | Willetts | 239/732 |
| 2,677,558 | A * | 5/1954 | Cornelius | 285/6 |
| 2,684,256 | A * | 7/1954 | Krukowski | 285/6 |
| 2,686,529 | A * | 8/1954 | Lanninger | 137/322 |
| 2,709,624 | A * | 5/1955 | Macchesney | 239/267 |
| 2,830,830 | A * | 4/1958 | Jacobs et al. | 285/6 |
| 2,889,993 | A * | 6/1959 | Willetts et al. | 239/111 |
| 3,360,283 | A * | 12/1967 | Guthrie | 285/110 |
| 3,869,154 | A * | 3/1975 | Sanchez | 285/133.21 |
| 3,907,341 | A * | 9/1975 | Schoepe | 285/236 |
| 3,955,834 | A * | 5/1976 | Ahlrot | 285/110 |
| 4,163,571 | A | 8/1979 | Nash | |
| 4,650,221 | A * | 3/1987 | Caillouet, Jr. | 285/87 |
| 5,211,429 | A * | 5/1993 | Charlson et al. | 285/238 |
| 6,045,033 | A | 4/2000 | Zimmerly | |
| 2003/0071462 | A1* | 4/2003 | Duncan et al. | 285/370 |
| 2003/0116968 | A1* | 6/2003 | Dallai et al. | 285/420 |

* cited by examiner

*Primary Examiner*—James M. Hewitt
(74) *Attorney, Agent, or Firm*—Donald J. Ersler (57) ABSTRACT

A pipe coupling method includes an inlet insert, a clamping ring, a clamp and the forming of a flange on an end of two adjacent pipes. A clamping ring includes an inner groove sized to receive the flanges of the two adjacent pipes. A first end of the inlet insert is inserted into a first pipe and the second end of the inlet insert is inserted into a second pipe. The clamp is placed over the clamping ring. The clamp is tightened to secure the two pipes. A second embodiment of the pipe coupling method includes an inlet insert, and a pair of latch clamps for joining a pipe to a sprinkler pipe. A third embodiment of the pipe coupling method includes an inlet insert, two collars, a peripheral clamp and enlarging a perimeter of two coupled pipes.

5 Claims, 12 Drawing Sheets

PIPE COUPLING METHODS

BACKGROUND OF THE INVENTION

1. Field of the Invention

The present invention relates generally to coupling a pipe to another pipe or to another object and more specially to pipe coupling methods, which enables the efficient connecting of a pipe to another pipe or to another object.

2. Discussion of the Prior Art

The prior art includes numerous methods of pipe coupling. Some of these prior art pipe coupling methods include U.S. Pat. No. 4,163,571 to Nash and U.S. Pat. No. 6,045,033 to Zimmerly. The Nash patent discloses pipe couplings. The Nash patent includes pipe coupling for two identical tubular parts with end flanges, by a clamping ring. However, the Nash patent requires the use of an adhesive to retain the flange on the pipe. Adhesive is not a positive way of retaining a flange on a pipe. The Zimmerly patent discloses a pipe connection and method. The Zimmerly patent includes a method of forming lengths of pipe for assembly together to form fluid flow conduits. However, the Zimmerly patent discloses the use of welding to attach a flange to an end of a pipe. A welding operation is susceptible to defects and requires human inspection to verify weld quality.

Accordingly, there is a clearly felt need in the art for pipe coupling methods, which provide a positive joint, do not require human inspection and includes the efficient connecting of a pipe to another pipe or to another object.

SUMMARY OF THE INVENTION

The present invention provides pipe coupling methods, which includes the efficient connecting of a pipe to another pipe or to another object. A pipe coupling method includes an inlet insert, a clamping ring, a clamp and the forming of a flange on an end of two adjacent pipes. The clamping ring includes an inner groove formed in a ring body. A first flange is formed on an end of the first pipe and a second flange is formed on an end of the second pipe. The inner groove is sized to receive the first and second flanges. The inlet insert includes a first end and a second end. The first end of the inlet insert is sized to be inserted into a first pipe and the second end of the inlet insert is sized to be inserted into a second pipe. At least one first sealing groove is formed around a perimeter of the first end and at least one second sealing groove is formed around a perimeter of the second end. Each sealing groove is sized to receive a sealing member.

The clamp preferably includes a first clamping body, a second clamping body and a draw latch. The first and second clamping bodies have a substantially semi-circular shape. The first and second clamping bodies are sized to receive and retain the clamping ring. One end of the first and second clamping bodies are pivotally attached to each other. The draw latch includes a draw lever and a draw arm. The draw lever is pivotally retained by one clamping body and the draw arm is pivotally retained by the other clamping body. The draw lever includes a draw slot, which is sized to receive an end of the draw arm. However, other designs of clamps may also be used. The clamp is placed over the clamping ring. The draw lever of the clamp is closed to couple the two adjacent pipes.

In a second embodiment, a pipe is joined to a sprinkler pipe. The sprinkler pipe 106 is fabricated from a pipe. The sprinkler pipe replaces a cast metal sprinkler housing. The second embodiment of a pipe coupling method includes an inlet insert, and a pair of latch clamps. The inlet insert includes a first end and a second end. The first end of the inlet insert is sized to be inserted into an inlet of the pipe and the second end of the inlet insert is sized to be inserted into an inlet of the sprinkler pipe. At least one first sealing groove is formed around a perimeter of the first end and at least one second sealing groove is formed around a perimeter of the second end. Each sealing groove is sized to receive a sealing member.

Each latch clamp preferably includes a retention tab, a latch arm and a latch mount. The retention tab is preferably attached to the sprinkler pipe and the latch mount is attached to the pipe. The latch arm is pivotally retained by the latch mount. A retention projection extends from an end of the latch arm. The retention projection is sized to be received by the retention tab to retain the pipe relative to the sprinkler pipe. The draw arm is closed to couple the pipe to the sprinkler pipe.

A third embodiment of a pipe coupling method includes an inlet insert, two end collars, a clamp and enlarging a perimeter of each end of the pipes to be coupled. Each end collar includes a ring body, flange projection and a ring projection. The flange projection extends radially from an end of the ring body and the ring projection extends from an outer edge of the flange projection. The perimeter of an end of each pipe is expanded to compensate for the wall thickness of the inlet insert. An inner perimeter of each collar is sized to receive the outer perimeter of a pipe, after thereof has been expanded.

A single end collar is slipped over the expanded end of the pipe, before the flange is formed thereupon. At least one sealing groove is formed on an inner perimeter of the expanded end of the pipe. Each sealing groove is sized to receive a sealing member. The inlet insert includes a first end and a second end. The first end of the inlet insert is sized to be inserted into an end of one pipe and the second end of the inlet insert is sized to be inserted into an adjacent end of the other pipe. The clamp receives the flange projection of each collar. The clamp is tightened to couple two adjacent pipes.

Accordingly, it is an object of the present invention to provide pipe coupling methods that include a positive joint.

It is a further object of the present invention to provide pipe coupling methods that do not require human inspection.

Finally, it is another object of the present invention to provide pipe coupling methods that include the efficient connecting of a pipe to another pipe or to another object.

These and additional objects, advantages, features and benefits of the present invention will become apparent from the following specification.

DETAILED DESCRIPTION OF THE PREFERRED EMBODIMENTS

Figure 1:
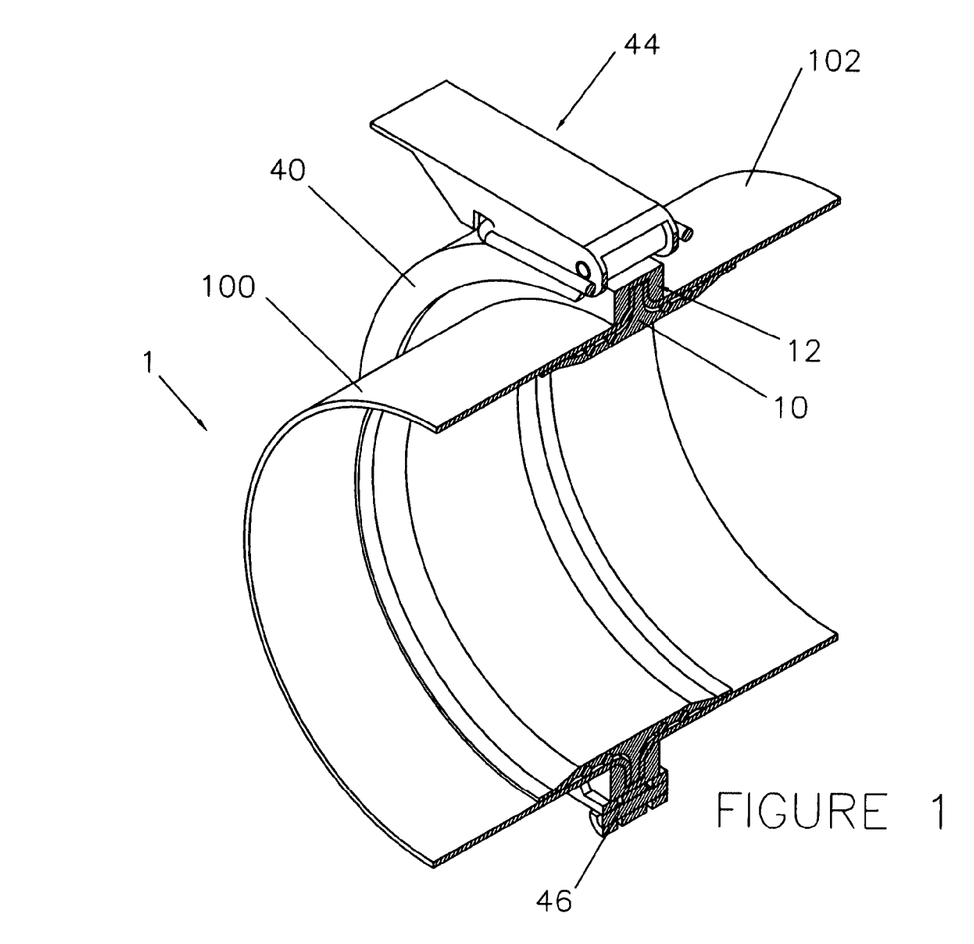
FIG. 1 is a perspective cross sectional view of a pipe coupling method for joining two pipes in accordance with the present invention.
Figure 2:
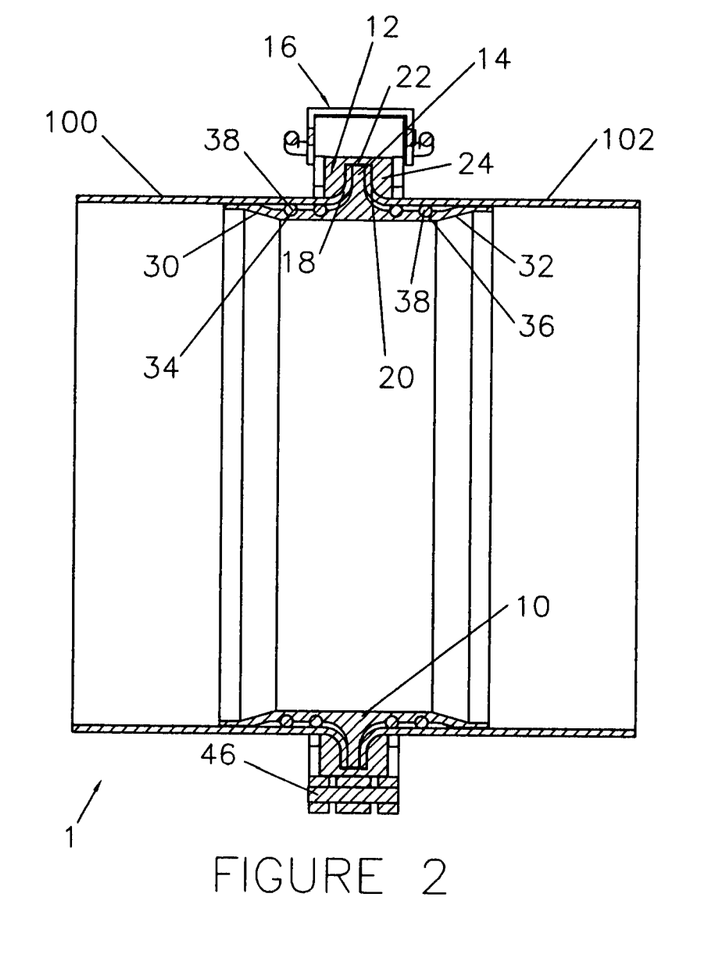
FIG. 2 is a cross sectional view of a pipe coupling method for joining two pipes in accordance with the present invention.
Figure 3:
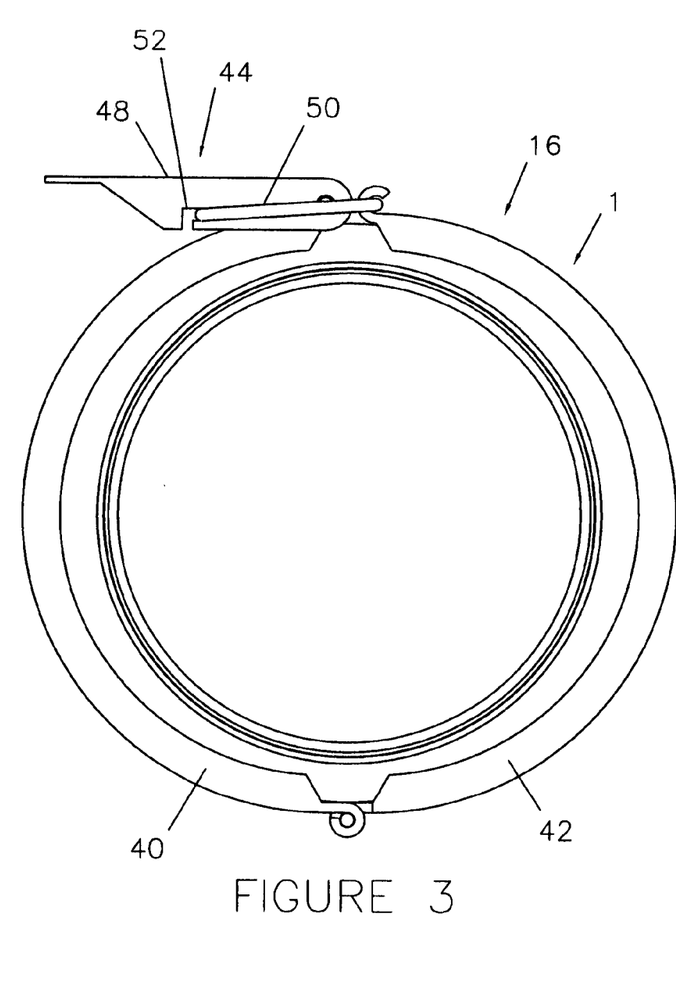
FIG. 3 is an end view of a pipe coupling method for joining two pipes in accordance with the present invention.

With reference now to the drawings, and particularly to FIG. 1, there is shown a cross sectional perspective view of a pipe coupling method 1. With reference to FIGS. 2–3, the pipe coupling method 1 includes an inlet insert 10, a clamping ring 12 a clamp 16, the forming of a first flange 18 on an end of a first pipe 100 and the forming of a second flange 20 on an end of a second pipe 102. The inlet insert 10 includes a first end, a second end and a peripheral projection 14 disposed between the first and second ends. The first end of the inlet insert 10 is sized to be received by an inlet of the first pipe 100 and the second end of the inlet insert 10 is sized to be received by an adjacent inlet of the second pipe 102.

An inner perimeter of the inlet insert 10 at a first end preferably includes a first taper 30 and the inner perimeter of the inlet insert 10 at a second end preferably includes a second taper 32. The first and second tapers improve flow characteristics inside the inlet insert 10. However, the first and second tapers are not included in other applications, where strength at the ends of the inlet insert 10 is needed. At least one first sealing groove 34 is formed around a perimeter of the first end of the inlet insert 10 and at least one second sealing groove 36 is formed around a perimeter of the second end thereof. Each sealing groove is sized to receive a sealing member 38. The at least two sealing members 38 seal a gap between a perimeter of the inlet insert 10 and the inner perimeters of the first or second pipes. The first and second flanges capture the peripheral projection 14 and prevent the inlet insert 10 from sliding axially. The clamping ring 12 includes an inner groove 22 formed in a ring body 24. The inner groove 22 is sized to receive the first flange 18, the peripheral projection 14 and the second flange 20. The clamping ring 12 is preferably fabricated from a resilient material, such as rubber.

The clamp 16 preferably includes a first clamping body 40, a second clamping body 42 and a draw latch 44. The first and second clamping bodies preferably have a substantially semi-circular shape and a U-shaped cross section. An inner width of the U-shaped cross section of the first and second clamping bodies are sized to receive and retain the clamping ring 12. One end of the first and second clamping bodies are pivotally attached to each other with a pivot pin 46. The draw latch 44 includes a draw lever 48 and a draw arm 50. The draw lever 48 is pivotally retained by the other end of one of the clamping bodies and the draw arm 50 is pivotally retained by the other end of the other clamping body. The draw lever 48 includes a draw slot 52, which is sized to receive an end of the draw arm 50. The draw lever 48 of the clamp is closed to couple the first and second pipes. However, other types of clamps may be used, besides that disclosed in FIGS. 1–3.

Figure 4:
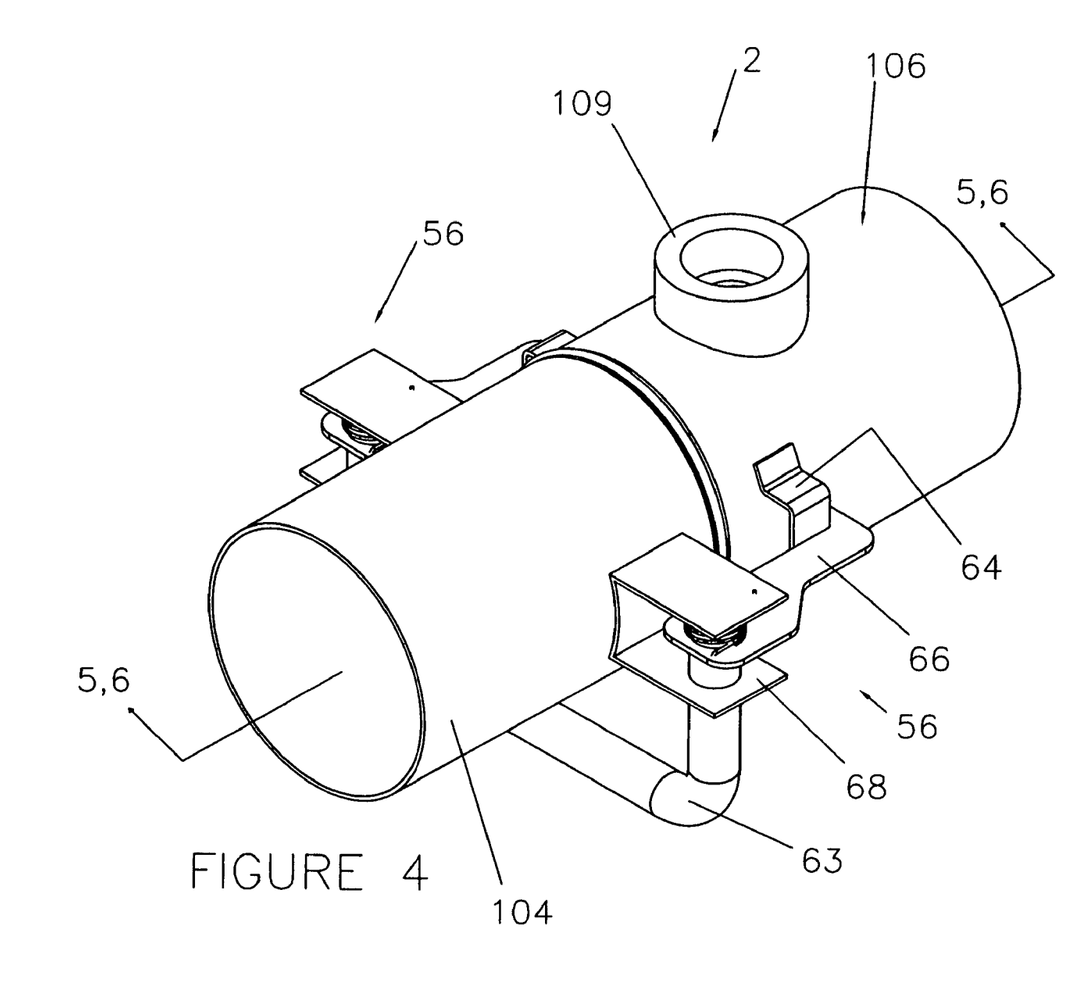
FIG. 4 is a perspective view of a second embodiment of a pipe coupling method for joining a pipe to a sprinkler pipe in accordance with the present invention.
Figure 5:
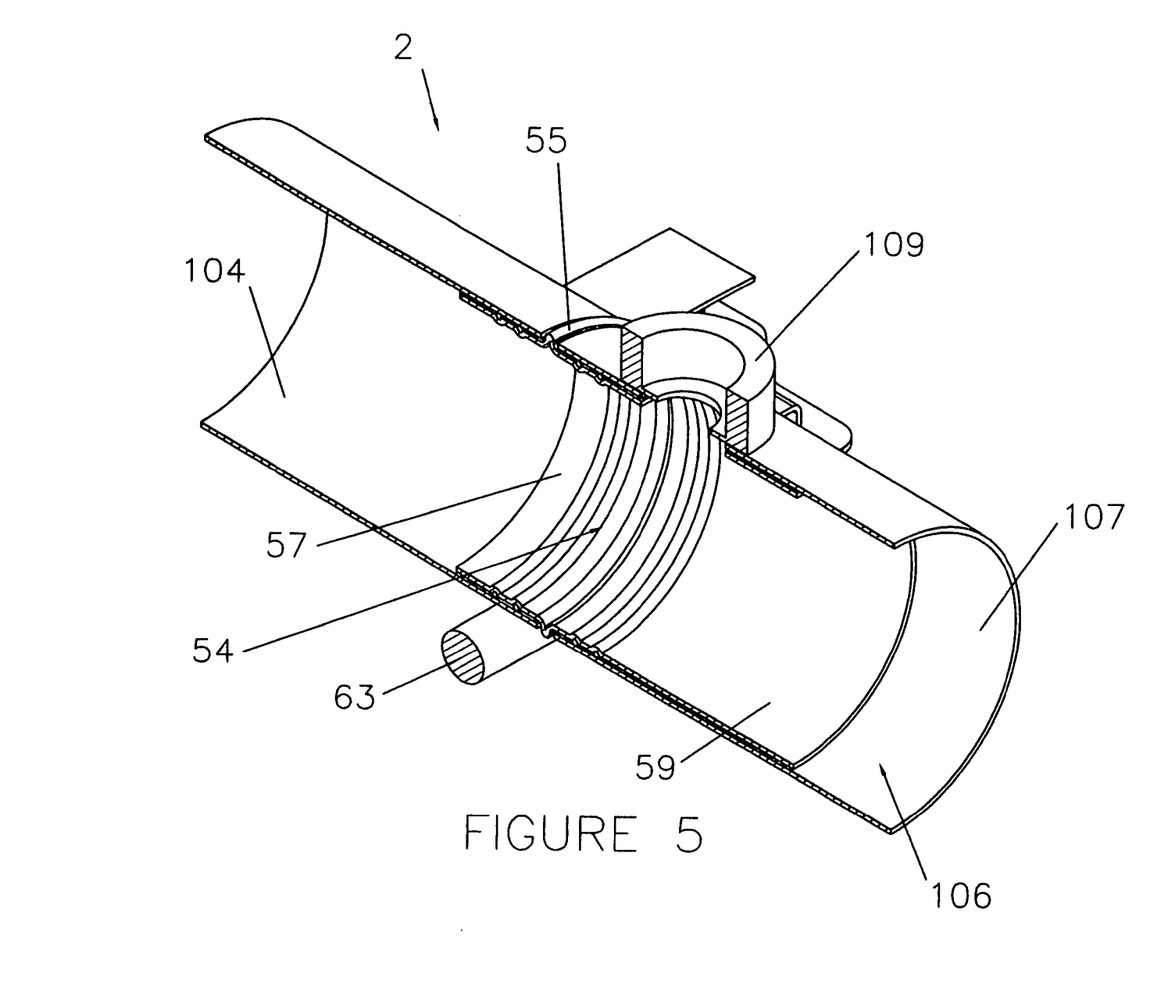
FIG. 5 is a perspective cross sectional view of a second embodiment of a pipe coupling method for joining a pipe to a sprinkler pipe in accordance with the present invention.
Figure 6:
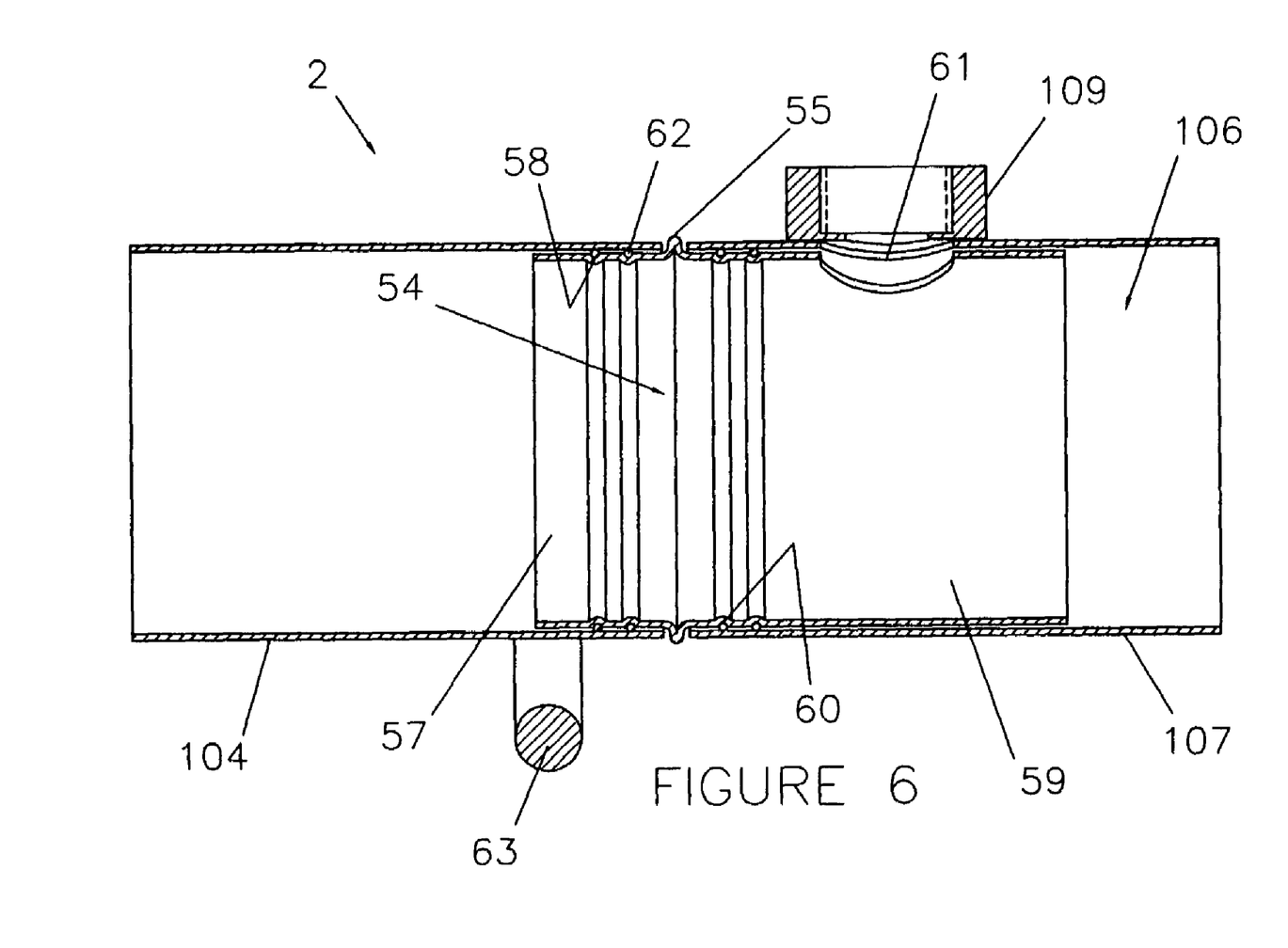
FIG. 6 is a cross sectional view of a second embodiment of a pipe coupling method for joining a pipe to a sprinkler pipe in accordance with the present invention.
Figure 7:
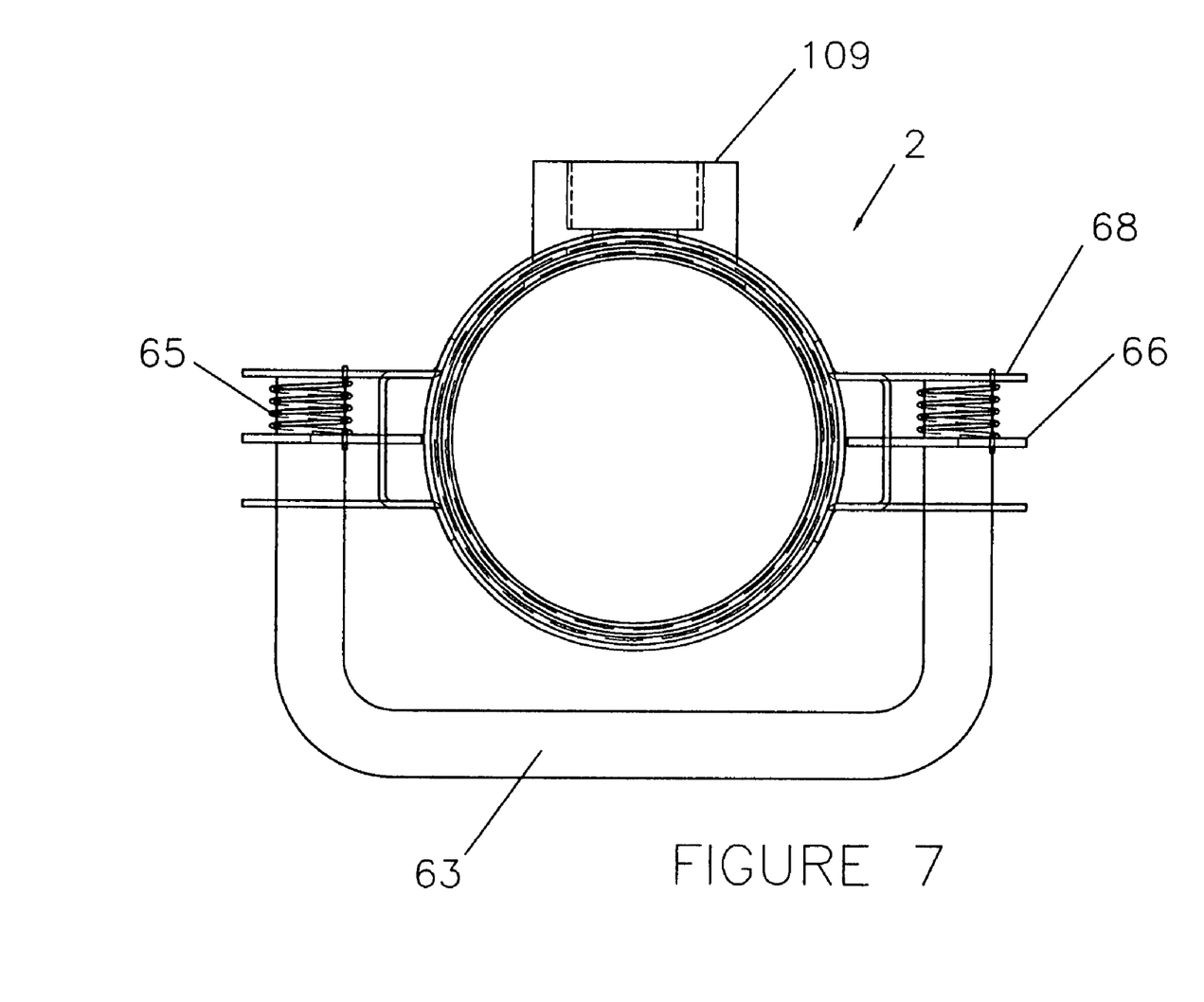
FIG. 7 is an end view of a second embodiment of a pipe coupling method for joining a pipe to a sprinkler pipe in accordance with the present invention.
Figure 8:
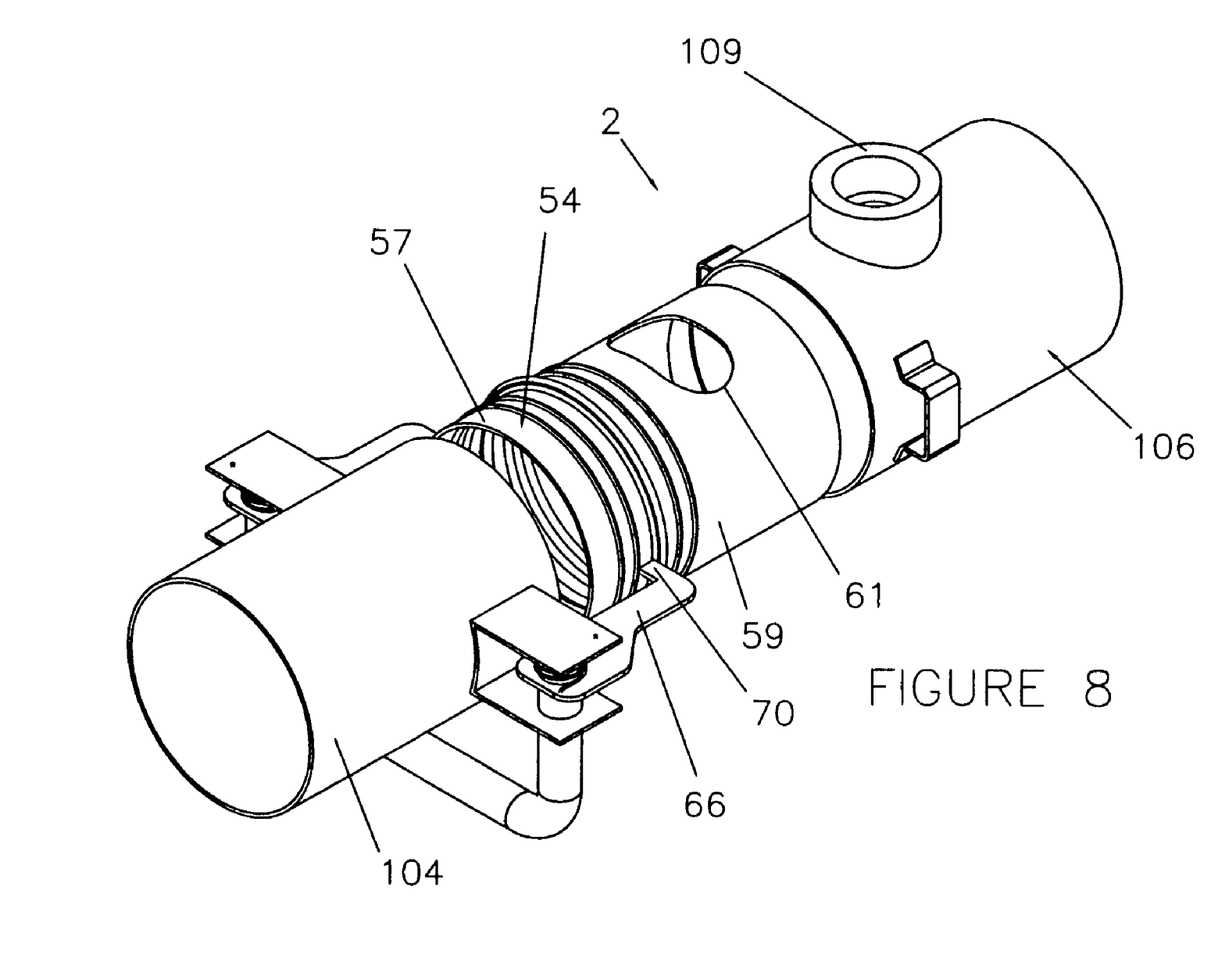
FIG. 8 is a partially exploded perspective view of a second embodiment of a pipe coupling method for joining a pipe to a sprinkler pipe in accordance with the present invention.
Figure 9:
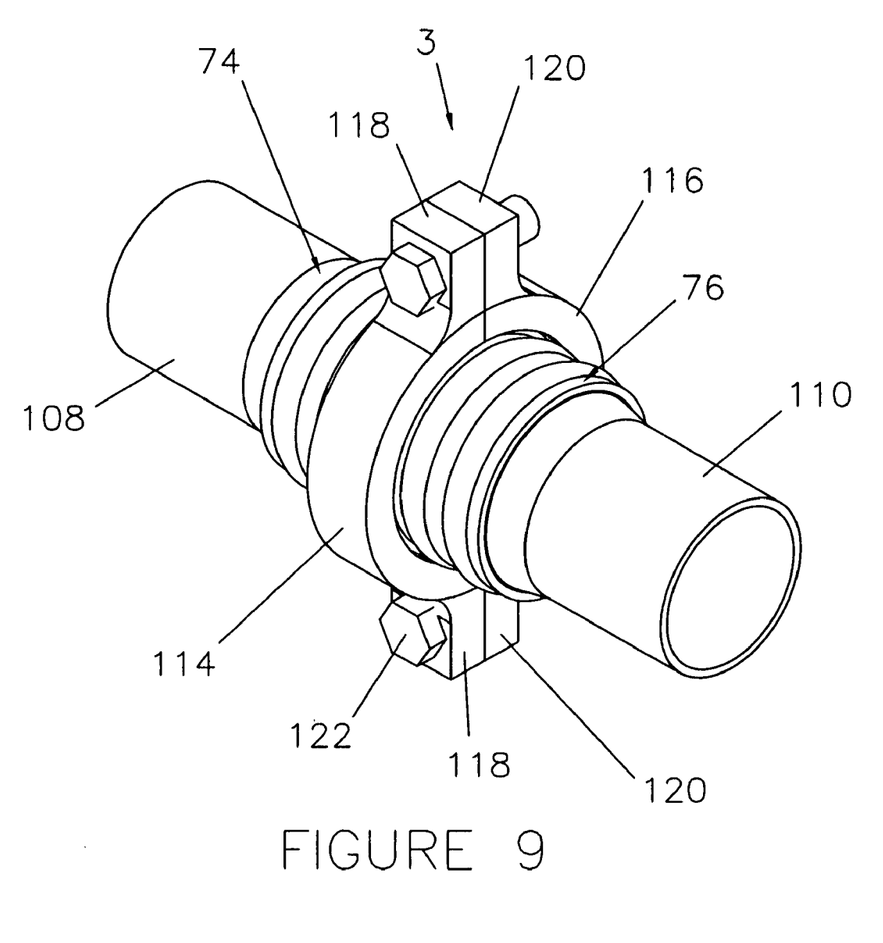
FIG. 9 is a perspective view of a third embodiment of a pipe coupling method for joining two pipes in accordance with the present invention.
Figure 10:
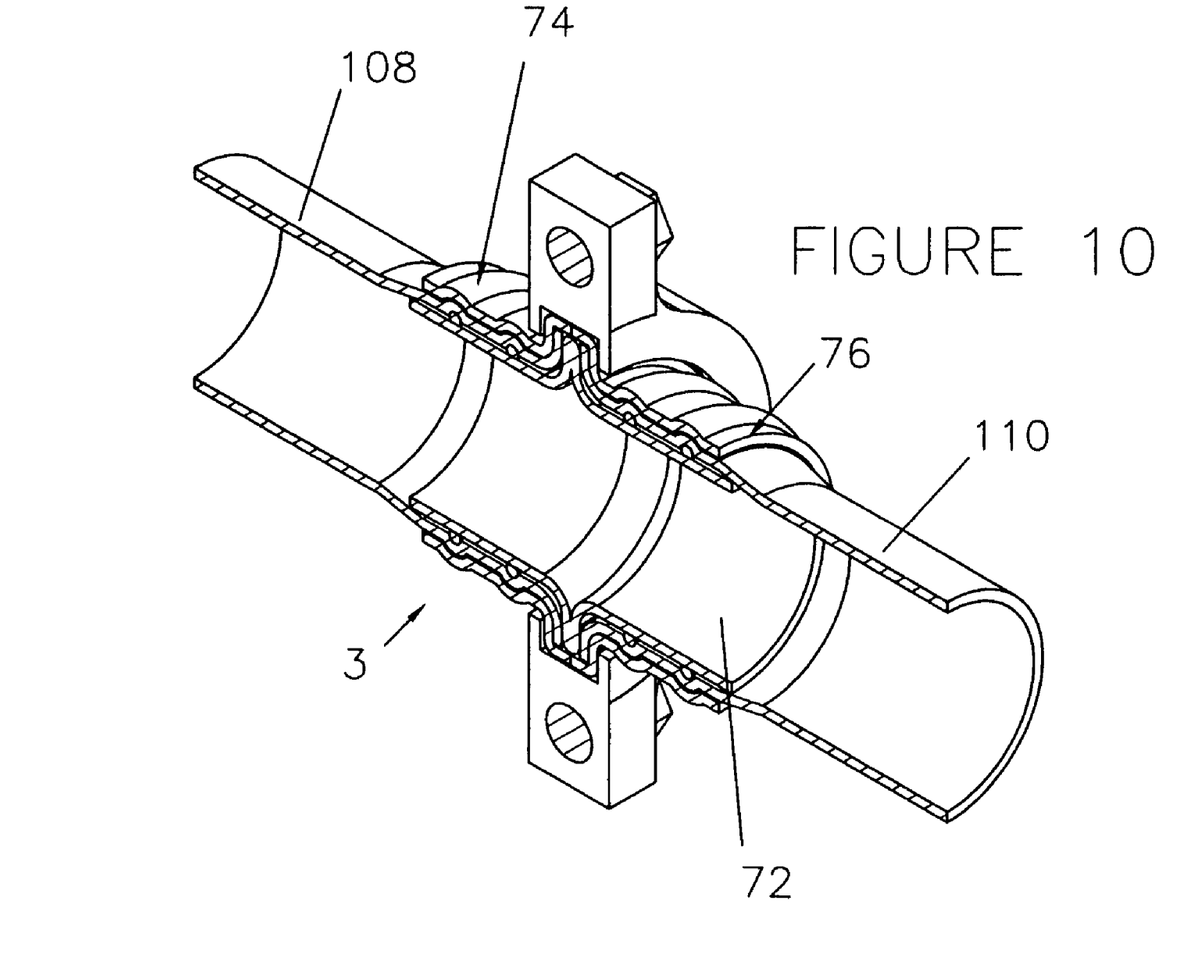
FIG. 10 is a perspective cross sectional view of a third embodiment of a pipe coupling method for joining two pipes in accordance with the present invention.
Figure 11:
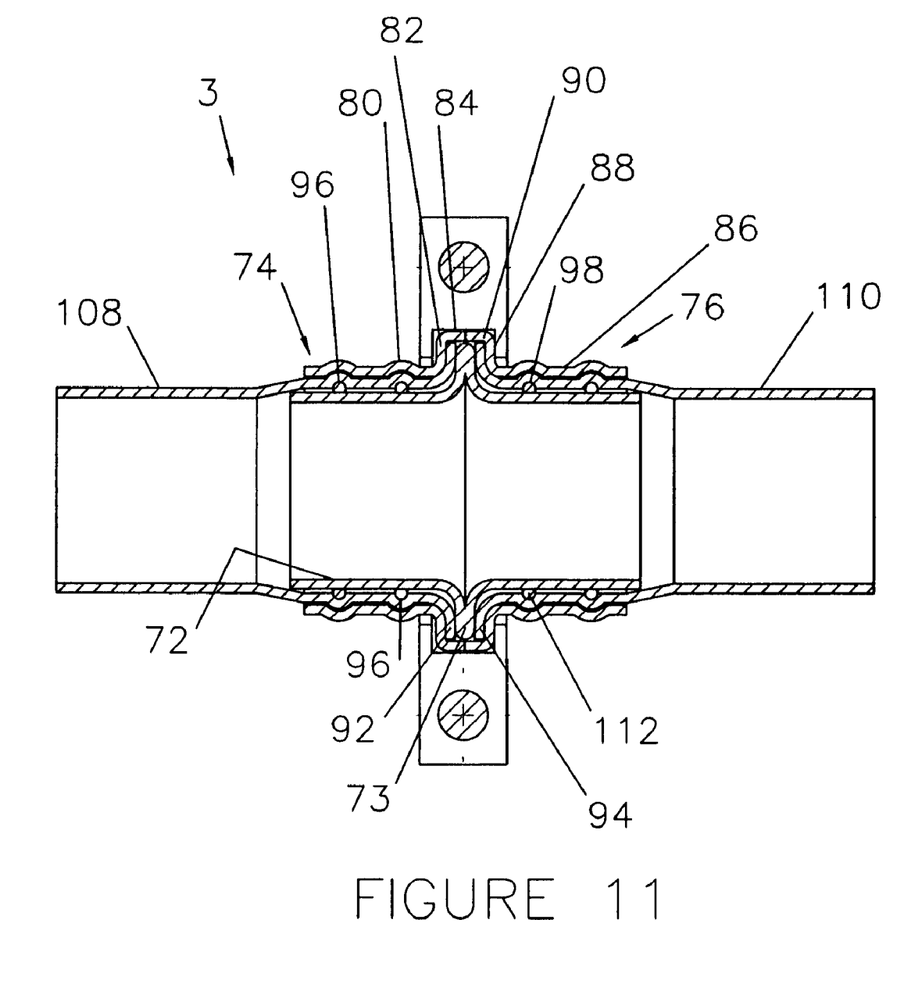
FIG. 11 is a cross sectional view of a third embodiment of a pipe coupling method for joining two pipes in accordance with the present invention.
Figure 12:
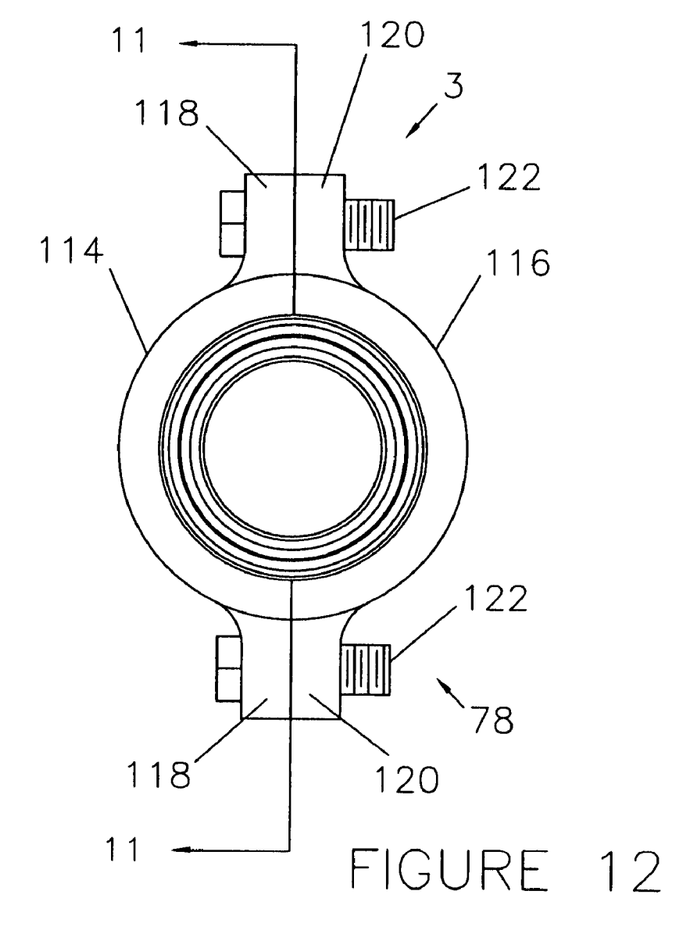
FIG. 12 is an end view of a third embodiment of a pipe coupling method for joining two pipes in accordance with the present invention.

FIG. 4 shows a second embodiment of a pipe coupling method 2, where a pipe 104 is joined to a sprinkler pipe 106. The sprinkler pipe 106 is fabricated from a pipe 104. The sprinkler pipe 106 replaces a cast metal sprinkler housing. With reference to FIG. 5, the sprinkler pipe 106 is preferably fabricated by attaching a boss 109 to a wall of a tube 107 with any suitable method, such as welding. The boss 109 is tapped through to receive a fitting (not shown). However, the sprinkler pipe 106 may also be fabricated from a casting. With reference to FIGS. 6–8, the second embodiment of a pipe coupling method 2 includes an inlet insert 54, and a pair of latch clamps 56. The inlet insert 54 includes a first end 57, a second end 59 and a peripheral projection 55 disposed between the first and second ends. The first end 57 of the inlet insert 54 is sized to be received by an inner perimeter of the pipe 104 and the second end 59 of the inlet insert 54 is sized to be received by an inner perimeter of the sprinkler pipe 106. The second end 59 is preferably long enough to support the area around boss 109. A water opening 61 is formed through the second end 59, concentric with the boss 109.

At least one first sealing groove 58 is formed around a perimeter of the first end of the inlet insert 54 and at least one second sealing groove 60 is formed around a perimeter of the second end thereof. Each sealing groove is sized to receive a sealing member 62. The at least two sealing members 62 seal a gap between a perimeter of the inlet insert 10 and the inner perimeter of the pipe 104 or the sprinkler pipe 106. Adjacent ends of the pipe 104 and the sprinkler pipe 106 capture the peripheral projection 55 and prevent the inlet insert 54 from sliding axially.

Each latch clamp 56 preferably includes a retention tab 64, a torsion spring 65, a latch arm 66 and a latch mount 68. A support member 63 having a substantially U-shape extends between two opposing latch clamps 56. Each end the support member 63 is secured to opposing latch mounts 68. The retention tab 64 is preferably attached to the sprinkler pipe 106 and the latch mount 68 is attached to the pipe 104. The latch arm 66 is pivotally retained by an end of the support member 63. A retention projection 70 extends from an end of the latch arm 66. The retention projection 70 is sized to be received by the retention tab 64 to retain the pipe 104 relative to the sprinkler pipe 106. A torsion spring 65 urges the retention projection 70 toward the perimeter of the pipe 104. One end of the torsion spring 65 is inserted through a hole in the latch mount 68 and the other end of the torsion spring 65 is inserted through a hole in the latch arm 66. The latch arm 66 is closed to couple the pipe 104 to the sprinkler pipe 106. However, other types of clamps may also be used to secure the pipe 104 to the sprinkler pipe 106.

A third embodiment of a pipe coupling method 3 includes an inlet insert 72, a first end collar 74, a second end collar 76, a clamp 78, enlarging a perimeter of one end of a first pipe 108, enlarging a perimeter of one end of a second pipe 110. The first end collar 74 includes a first ring body 80, a first flange projection 82 and a first ring projection 84. The first flange projection 82 extends radially from an end of the first ring body 80 and the first ring projection 84 extends from an outer edge of the first flange projection 82. The second end collar 76 includes a second ring body 86, a second flange projection 88 and a second ring projection 90. The second flange projection 88 extends radially from an end of the second ring body 86 and the second ring projection 90 extends from an outer edge of the second flange projection 88. An inner perimeter of the first end collar is sized to receive an expanded outer perimeter of the first pipe 108 and an inner perimeter of the second end collar 76 is sized to receive an expanded outer perimeter of the second pipe 110.

The inner perimeter of an end of the first pipe 108 and an adjacent end of the second pipe 110 are expanded to compensate for the wall thickness of the inlet insert 72. The inner perimeter of the insert inlet 72 is substantially equal to the inner perimeter of the first and second pipes to provide a non-interrupted flow path. The first end collar 74 is slipped over the expanded end of the first pipe 108, before a first flange 92 is formed thereupon. The second end collar 76 is slipped over the expanded end of the second pipe 110, before a second flange 94 is formed thereupon. At least one first sealing groove 96 is formed on an inner perimeter of the expanded end of the first pipe 108 and at least one second sealing groove 98 is formed on an inner perimeter of the expanded end of the second pipe 110. Each sealing groove is sized to receive a sealing member 112.

The inlet insert 72 includes a first end, a second end and a peripheral projection 73 disposed between the first and second ends. The first end of the inlet insert 72 is sized to be received by an expanded inlet of the first pipe 108 and the second end of the inlet inert 72 is sized to be received by an expanded inlet of the second pipe 110. The first and second flanges capture the peripheral projection 73 and prevent the inlet insert 72 from sliding axially. The clamp 78 preferably includes a first clamping body 114 and a second clamping body 116. The first and second clamping bodies have a substantially semi-circular shape and a U-shaped cross section. An inner width of the U-shaped cross section of the first and second clamping bodies are sized to receive and retain the two collars, the two flanges and the peripheral projection 73.

A first flange member 118 extends from each end of the first clamp body 114 and a second flange member 120 extends from each end of the first clamp body 116. A tapped hole is formed through one of the flange members and a clearance hole is formed through the adjacent flange member to threadably receive a threaded fastener 122. The two threaded fasteners are used to close the clamp 78. However, other types of clamps may be used, besides the one disclosed in FIGS. 9–12.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of coupling a pipe and a sprinkler pipe, comprising the steps of:
   providing an inlet insert that is inserted into inlets of the pipe and the sprinkler pipe;
   providing a sealing member between said inlet insert and at least one of the pipe and the sprinkler pipe;
   attaching a retention tab to one of the pipe and the sprinkler pipe; and
   attaching pivotally a latch to one of the sprinkler pipe and the pipe, engaging said latch with said retention tab to couple the pipe and the sprinkler pipe.

2. A method of coupling a pipe and a sprinkler pipe of claim 1, comprising the steps of:
   forming at least one first sealing groove in a first end of said inlet insert and forming at least one second sealing groove in a second end of said inlet insert.

3. A method of coupling a pipe and a sprinkler pipe of claim 2, comprising the steps of:
   providing a said sealing member in each said sealing groove, each said sealing member providing a seal between said inlet insert and the pipe or the sprinkler pipe.

4. A method of coupling a pipe and a sprinkler pipe of claim 1, comprising the steps of:
   forming a peripheral projection around said inlet insert.

5. A method of coupling a pipe and a sprinkler pipe of claim 1, comprising the steps of:
   fabricating the sprinkler pipe by attaching a boss to a wall of a pipe and tapping the boss to threadably receive a fitting.

* * * * *